US012255430B2

(12) United States Patent
Candelaria et al.

(10) Patent No.: US 12,255,430 B2
(45) Date of Patent: Mar. 18, 2025

(54) INSULATION PIERCING TAP CONNECTORS FOR ELECTRICAL CONDUCTORS

(71) Applicant: Hubbell Incorporated, Shelton, CT (US)

(72) Inventors: Adrian Beau Candelaria, Alabaster, AL (US); James Marc Hansen, Hoover, AL (US); Syed Taha Imam, Hoover, AL (US)

(73) Assignee: Hubbell Incorporated, Shelton, CT (US)

(*) Notice: Subject to any disclaimer, the term of this patent is extended or adjusted under 35 U.S.C. 154(b) by 324 days.

(21) Appl. No.: 17/835,910

(22) Filed: Jun. 8, 2022

(65) Prior Publication Data

US 2022/0302606 A1 Sep. 22, 2022

Related U.S. Application Data

(63) Continuation of application No. PCT/US2020/063990, filed on Dec. 9, 2020.

(60) Provisional application No. 62/945,648, filed on Dec. 9, 2019.

(51) Int. Cl.

*H01R 4/2406* (2018.01)
*H01R 4/2408* (2018.01)
*H01R 4/70* (2006.01)

(52) U.S. Cl.

CPC ......... *H01R 4/2406* (2018.01); *H01R 4/2408* (2013.01); *H01R 4/70* (2013.01)

(58) Field of Classification Search

CPC ...... H01R 4/2406; H01R 4/2408; H01R 4/70; H01R 11/15; H01R 43/01

See application file for complete search history.

(56) References Cited

U.S. PATENT DOCUMENTS

| | | | | |
|---|---|---|---|---|
| 3,668,613 A | | 6/1972 | Klosin | |
| 4,032,212 A | * | 6/1977 | Faust | H01R 4/2408 439/412 |
| 4,112,944 A | * | 9/1978 | Williams | A61B 17/122 606/157 |
| 4,684,196 A | | 8/1987 | Smith et al. | |
| 4,853,625 A | * | 8/1989 | Fodali | G01R 1/06788 324/754.02 |
| 5,704,816 A | | 1/1998 | Polidori | |
| 2008/0194153 A1 | | 8/2008 | De France | |
| 2010/0003846 A1 | | 1/2010 | Diniz et al. | |

(Continued)

FOREIGN PATENT DOCUMENTS

CN 110277655 A 9/2019

*Primary Examiner* — Oscar C Jimenez
(74) *Attorney, Agent, or Firm* — Ruggiero McAllister & McMahon LLC

(57) ABSTRACT

A tap connector for piercing an insulation of a conductor is provided. The tap connector includes a first jaw, a second jaw, a hinged connection, a compression connection, and a piercing insert. The hinged connection connects an end of the first and second jaws to one another. The compression connection removably connects an opposite end of the first and second jaws to one another. The piercing insert depends from the first jaw in an electrically conductive manner between the end and the opposite end. The piercing insert and the first jaw are made of or at least coated with an electrically conductive material.

19 Claims, 8 Drawing Sheets

(56) References Cited

U.S. PATENT DOCUMENTS

| | | | | |
|---|---|---|---|---|
| 2010/0015862 | A1 | 1/2010 | Gregrory et al. | |
| 2012/0208389 | A1* | 8/2012 | Nakatsuji ............. | H01R 4/2406<br>439/345 |
| 2013/0183874 | A1 | 7/2013 | Cawood et al. | |
| 2015/0162670 | A1 | 6/2015 | Galla et al. | |
| 2016/0020529 | A1 | 1/2016 | Martin | |
| 2019/0260142 | A1 | 8/2019 | Ruggiero | |

* cited by examiner

INSULATION PIERCING TAP CONNECTORS FOR ELECTRICAL CONDUCTORS

CROSS REFERENCE TO RELATED APPLICATIONS

This application is a continuation of International Application PCT/US20/63990 filed on Dec. 9, 2020, which claims the benefit of U.S. Application 62/945,648 filed on Dec. 9, 2019, the contents of both of which are incorporated by reference herein.

BACKGROUND

1. Field of the Invention

The present disclosure is related to tap connectors. More particularly, the present disclosure is related to tap connectors that pierce the insulation of electrical conductors.

2. Description of Related Art

Aerial high-tension electrical conductors are typically strung to feed power from a power source to an auxiliary device such as, but not limited to transformers, switches, cutouts, arresters, electric panels, etc.

When power is to be transferred from the electrical power conductor to the auxiliary device, tap connectors are used. Thus, there have been proposed tap connectors of different sizes, shapes, and configurations.

More recently, it has been proposed to provide the high-tension electrical conductors with an insulation or coating (insulation). Such insulated electrical conductors have found use in areas where the conductors are exposed to shorts due to vegetation and/or wild life. Since many prior art tap connectors are incapable of piercing the insulation, the insulation must be removed prior to attaching these prior art tap connectors, which increase the time and cost of such installations.

Accordingly, it has been determined by the present disclosure that there is a need for tap connectors that pierce the insulation of high-tension electrical conductors.

SUMMARY

A tap connector for piercing an insulation of a conductor is provided. The tap connector includes a first jaw, a second jaw, a hinged connection, a compression connection, and a piercing insert. The hinged connection connects an end of the first and second jaws to one another. The compression connection removably connects an opposite end of the first and second jaws to one another. The piercing insert depends from the first jaw in an electrically conductive manner between the end and the opposite end. The piercing insert and the first jaw are made of or at least coated with an electrically conductive material.

In some embodiments either alone or together with any one or more of the aforementioned and/or after-mentioned embodiments, the piercing insert is positioned closer to the opposite end than to the end.

In some embodiments either alone or together with any one or more of the aforementioned and/or after-mentioned embodiments, the tap connector further includes an insulating cover covering the first and/or second jaw.

In some embodiments either alone or together with any one or more of the aforementioned and/or after-mentioned embodiments, the tap connector further includes a stirrup made of or at least coated with an electrically conductive material. The stirrup is connected in an electrically conductive manner to the first jaw.

In some embodiments either alone or together with any one or more of the aforementioned and/or after-mentioned embodiments, the hinged connection further includes a hinge pin integrally defined on the first member and a hinge knuckle integrally defined on the second member.

In some embodiments either alone or together with any one or more of the aforementioned and/or after-mentioned embodiments, the hinge pin extends laterally from both sides of the first member and the hinge knuckle extends laterally from both sides of the second member.

In some embodiments either alone or together with any one or more of the aforementioned and/or after-mentioned embodiments, the tap connector further includes a stirrup made of or at least coated with an electrically conductive material. The stirrup is connected in an electrically conductive manner to opposite ends of the hinge pin.

In some embodiments either alone or together with any one or more of the aforementioned and/or after-mentioned embodiments, the hinge knuckle is an open knuckle.

In some embodiments either alone or together with any one or more of the aforementioned and/or after-mentioned embodiments, the compression connection is a threaded connection having a bolt and a nut.

In some embodiments either alone or together with any one or more of the aforementioned and/or after-mentioned embodiments, the tap connector further includes an insulating cover covering the first and second jaws, the bolt and nut being operatively retained in position by the insulating cover.

In some embodiments either alone or together with any one or more of the aforementioned and/or after-mentioned embodiments, the first and second members each further include an elongated opening and a convex curved lands on an outer surface at the compression connection.

In some embodiments either alone or together with any one or more of the aforementioned and/or after-mentioned embodiments, the piercing insert includes a plurality of teeth separated from one another by a gap.

In some embodiments either alone or together with any one or more of the aforementioned and/or after-mentioned embodiments, the plurality of teeth are substantially parallel to one another and have tips formed as pointed cones that all terminate at a flat piercing plane.

In some embodiments either alone or together with any one or more of the aforementioned and/or after-mentioned embodiments, the piercing insert depending from the first jaw so that the plurality of teeth are parallel to the conductor.

In some embodiments either alone or together with any one or more of the aforementioned and/or after-mentioned embodiments, the second jaw further includes a centering indentation opposite the piercing insert.

In some embodiments either alone or together with any one or more of the aforementioned and/or after-mentioned embodiments, the second jaw is made of or at least coated with an electrically conductive material.

In some embodiments either alone or together with any one or more of the aforementioned and/or after-mentioned embodiments, the second jaw is made of an electrically non-conductive material.

A tap connector for piercing an insulation of a conductor is also provided that includes a first jaw, a second jaw, a hinged connection, a compression connection, and a piercing insert. The hinged connection connects an end of the first and second jaws to one another. The compression connection removably connects the first and second jaws to one another. The piercing insert has a plurality of teeth that are substantially parallel to one another and are separated from one another by a gap. The piercing insert depends from the first jaw in an electrically conductive manner so that the plurality of teeth are parallel to the conductor. The piercing insert and the first jaw are made of or at least coated with an electrically conductive material.

In some embodiments either alone or together with any one or more of the aforementioned and/or after-mentioned embodiments, the plurality of teeth have tips formed as pointed cones that all terminate at a flat piercing plane.

The above-described and other features and advantages of the present disclosure will be appreciated and understood by those skilled in the art from the following detailed description, drawings, and appended claims.

DETAILED DESCRIPTION

Figure 1:
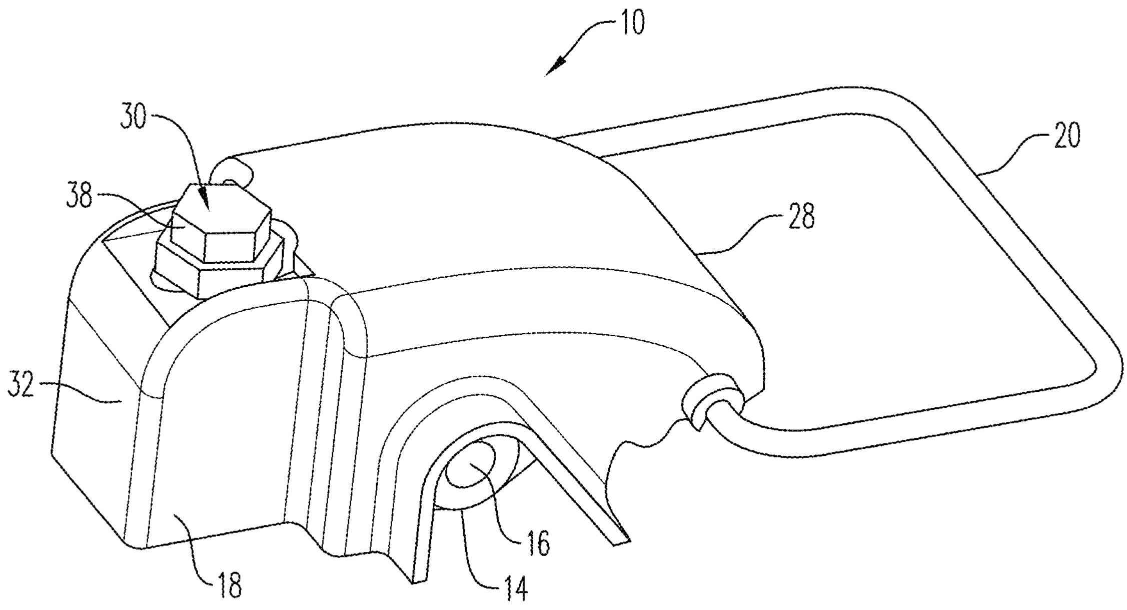
FIG. 1 is a top perspective view of an exemplary embodiment of a tap connector according to the present disclosure installed on an insulated electrical conductor.
Figure 2:
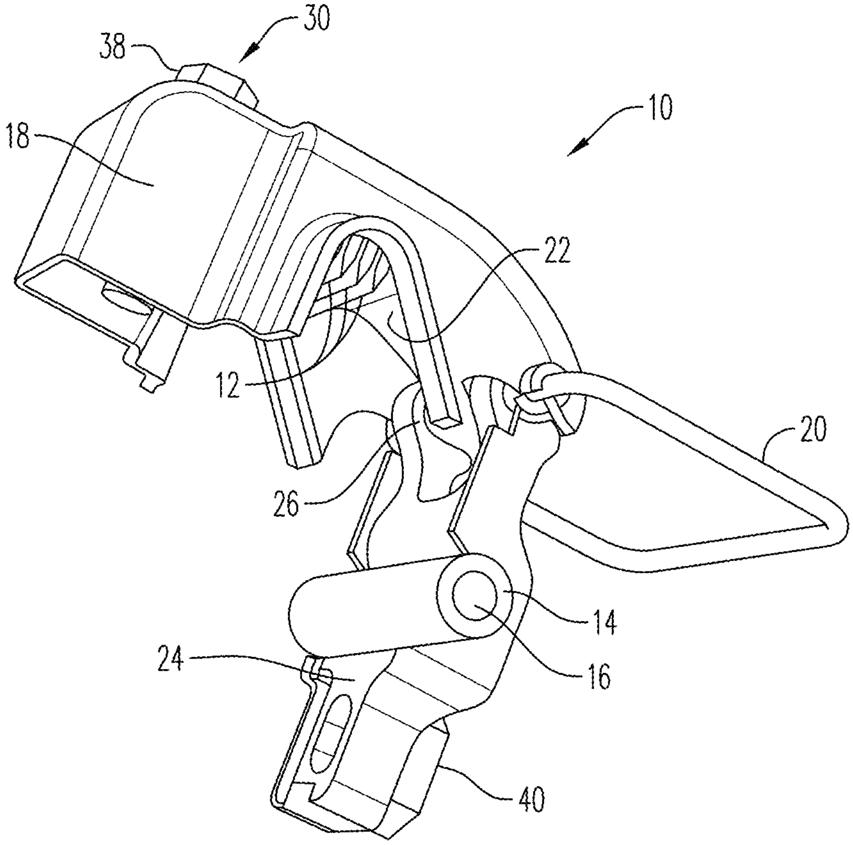
FIG. 2 is a bottom perspective view of the tap connector of FIG. 1 shown in an open position.
Figure 3:
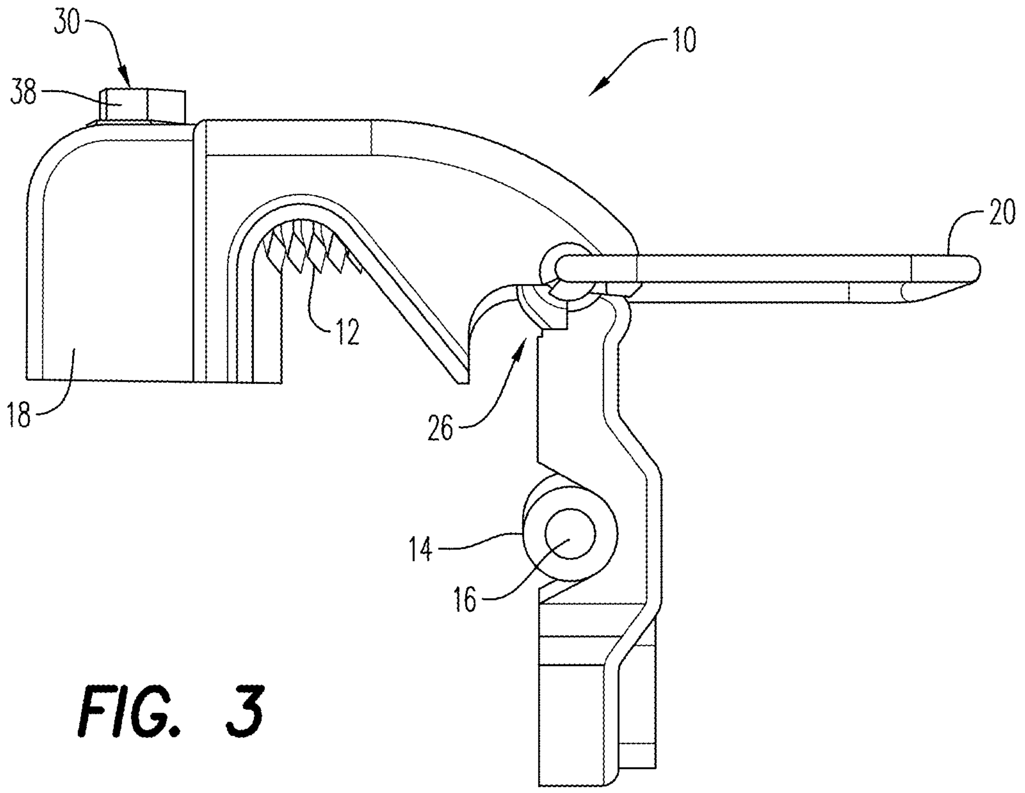
FIG. 3 is a side view of the tap connector of FIG. 1 shown in an open position.
Figure 4:
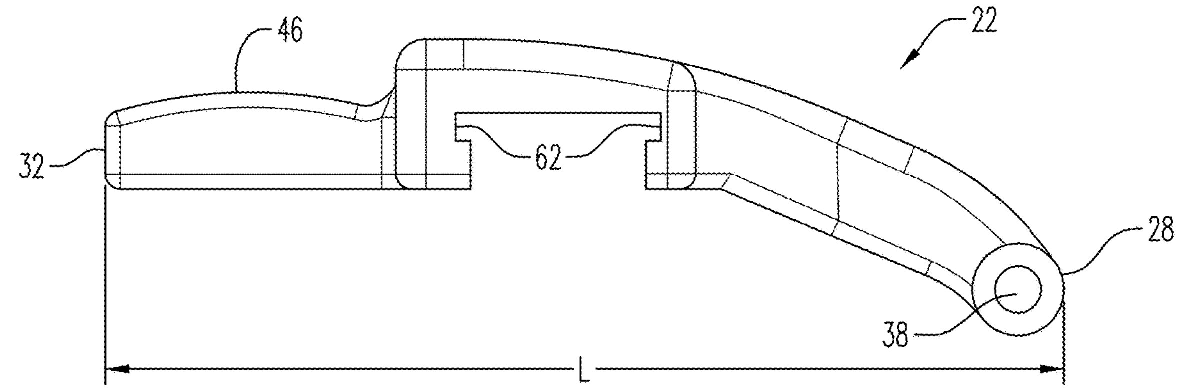
FIG. 4 is a side view of a first jaw of the tap connector of FIG. 1.
Figure 5:
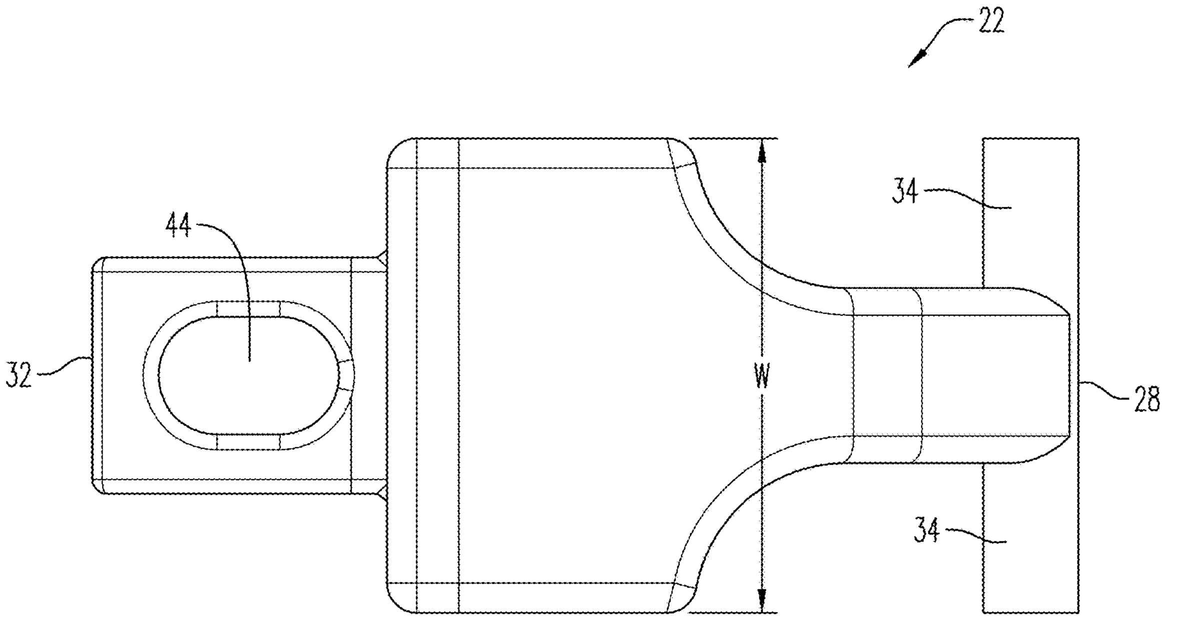
FIG. 5 is a top view of the first jaw of FIG. 4.
Figure 6:
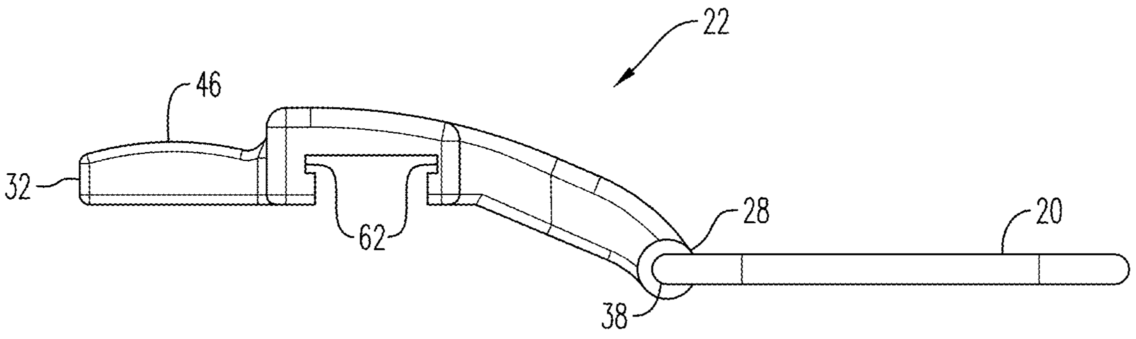
FIG. 6 is a side view of the first jaw of FIG. 4 having a stirrup secured thereto.
Figure 7:
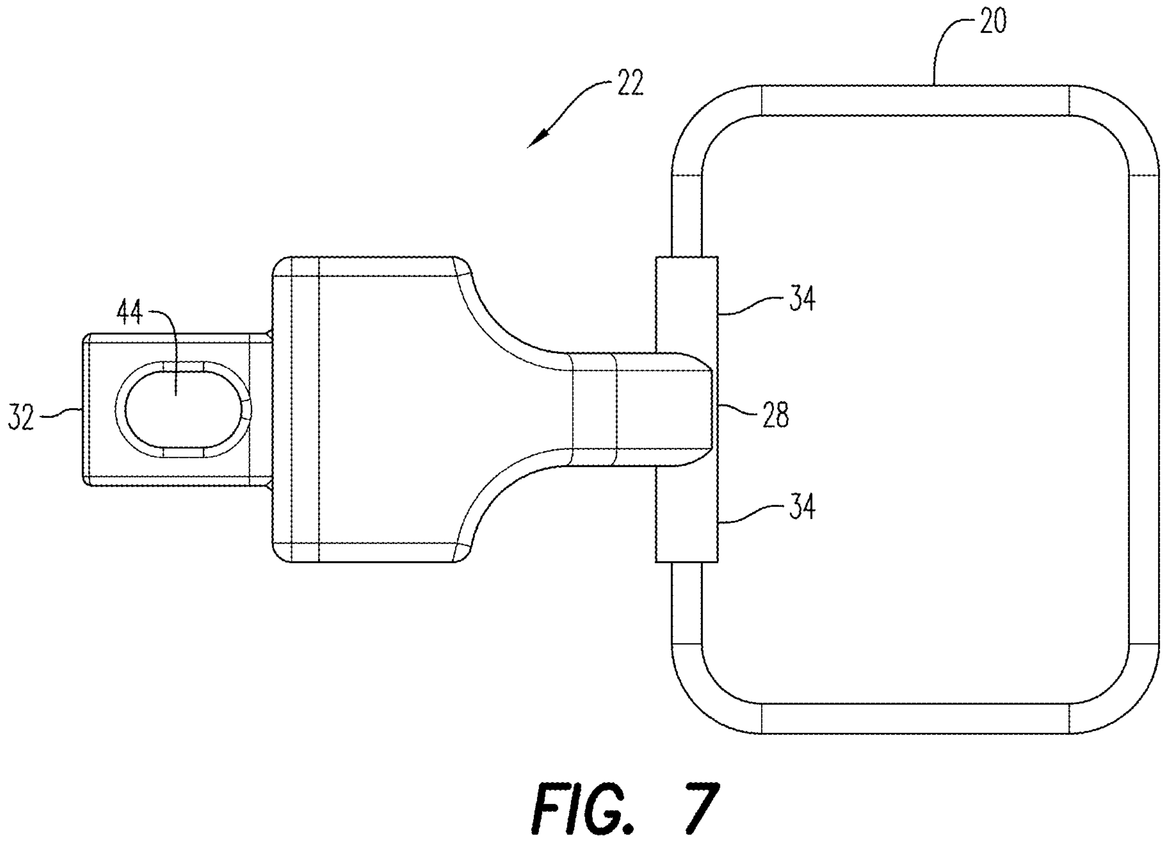
FIG. 7 is a top view of the first jaw of FIG. 6.

Referring to the drawings and in particular to FIGS. 1-3, an exemplary embodiment of a tap connector according to the present disclosure is shown and is generally referred to by reference numeral 10.

Although tap connector 10 is described with reference to the exemplary embodiments illustrated, it should be understood that the tap connector can be embodied in many alternate forms of embodiments and concepts of electrical contacts. In addition, any suitable size, shape or type of elements or materials could be used.

Advantageously, tap connector 10 includes a piercing insert 12 that allows the tap connector to pierce insulation 14 of electrical conductor 16. Tap connector 10 can, in some embodiments, include an insulating cover 18, which maintains the tap connector—once insert 12 has pierced insulation 14—in a generally insulated state.

Cover 18 can be formed of any insulating material such as but not limited to, rubber, polymers, including thermosetting or thermoplastic polymers, and others.

Further, tap connector 10 can include a stirrup or bail 20 that allows connection to the stirrup while conductor 16 is energized without inducing arching damage to the conductor. Stirrup 20 can be made of or at least coated with an electrically conductive material such as, but not limited to aluminum, copper, bronze, and any alloys or combinations thereof.

Tap connector 10 is described in more detail with simultaneous reference to FIGS. 1-9.

Tap connector 10 includes a first jaw 22 and a second jaw 24. First jaw 22 is made of or at least coated with an electrically conductive material such as, but not limited to aluminum, silver, copper, steel, nickel, iron, and any alloys or combinations thereof.

In some embodiments, second jaw 24 can also be made of or at least coated with an electrically conductive material such as, but not limited to aluminum, silver, copper, steel, nickel, iron, and any alloys or combinations thereof. However, it is also contemplated by the present disclosure for second jaw 24 to be made of non-conductive material such as, but not limited to, plastic, polymers, including thermosetting or thermoplastic polymers, and others.

Cover 18 is shown in the exemplary embodiment as separate from, but covering first and second jaws 22, 24. Of course, it is contemplated by the present disclosure for cover 18 to be connected to first and second jaws 22, 24 or for the cover to be molded directly to the first and second jaws, respectively.

Jaws 22, 24 include a hinged connection 26 at one end 28 and a removable compression connection 30 at an opposite end 32 with piercing insert 12 positioned between the ends. In some embodiments, members 22, 24 have a length (L) between ends 28, 32 with piercing insert 12 being positioned closer to end 32 having compression connection 30 than to end 28 having hinged connection 26.

Hinged connection 26 can be formed in any desired manner that allows first and second jaws 22, 24 to rotate about end 28. In the illustrated embodiment, hinged connection 26 is defined by a hinge pin 34 integrally defined on first member 22 at end 28 and a hinge knuckle 36 integrally defined on second member 24 at end 28.

Hinge pin 34 is shown extending laterally from both sides of first member 22. Of course, it is contemplated by the present disclosure for pin 34 to extend laterally from only one side of first member 22. Furthermore, it is contemplated by the present disclosure for pin 34 to be a separate component that is connected to first member 22.

In embodiments of tap connector 10 having stirrup 20, hinge pin 34 can be used for connection of the stirrup and first member 22. For example, hinge pin 34 can further include openings 38 shown at the ends of the pin where the openings secure stirrup 20 therein. In some embodiments, pin 34 can be indented or deformed onto stirrup 20 to close openings 38, securing the stirrup and the pin to one another in an electrically conductive manner.

Knuckle 36, in some embodiments, is an open knuckle that can receive pin 34. Knuckle 36 preferably extends laterally from both sides of second member 24. Of course, it is contemplated by the present disclosure for knuckle 36 to be a closed knuckle that slideably receives the pin and/or for the knuckle to extend laterally from only one side of second member 24. Furthermore, it is contemplated by the present disclosure for knuckle 36 to be a separate component that is connected to second member 24.

Compression connection 30 can be formed in any desired manner that allows first and second jaws 22, 24 to be secured to one another at end 32 and to compress the jaws onto conductor 16 as described in more detail below.

In the illustrated embodiment, compression connection 30 is a threaded connection that includes a bolt 40 and a nut 42. In some embodiments, bolt 40 and nut 42 are operatively retained in position by cover 18 so that tap connector 10 can be maintained as a single component.

First and second members 22, 24 can include elongated openings 44, respectively. First and second members 22, 24 can alternately or additionally include convex curved lands 46 on outer surfaces of compression connection 30.

Without wishing to be bound by any particular theory, it is believed by the present disclosure that elongated openings 44 and/or lands 46 provide compression connection 30 sufficient freedom within first and second members 22, 24 to allow the aforementioned hinged movement around conductor 14 while bolt 38 and nut 40 are retained in cover 18.

Additionally or alternately and without wishing to be bound by any particular theory, it is believed by the present disclosure that elongated openings 44 and/or lands 46 provide compression connection 30 sufficient freedom within first and second members 22, 24 to allow the tap connector 10 to find use with conductors 14 having a range of diameters from small gauge conductors to large gage conductors.

Figure 10:
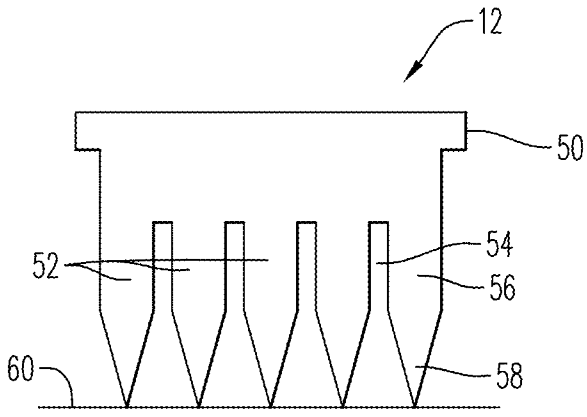
FIG. 10 is an end view of a piercing insert of the tap connector of FIG. 1.
Figure 11:
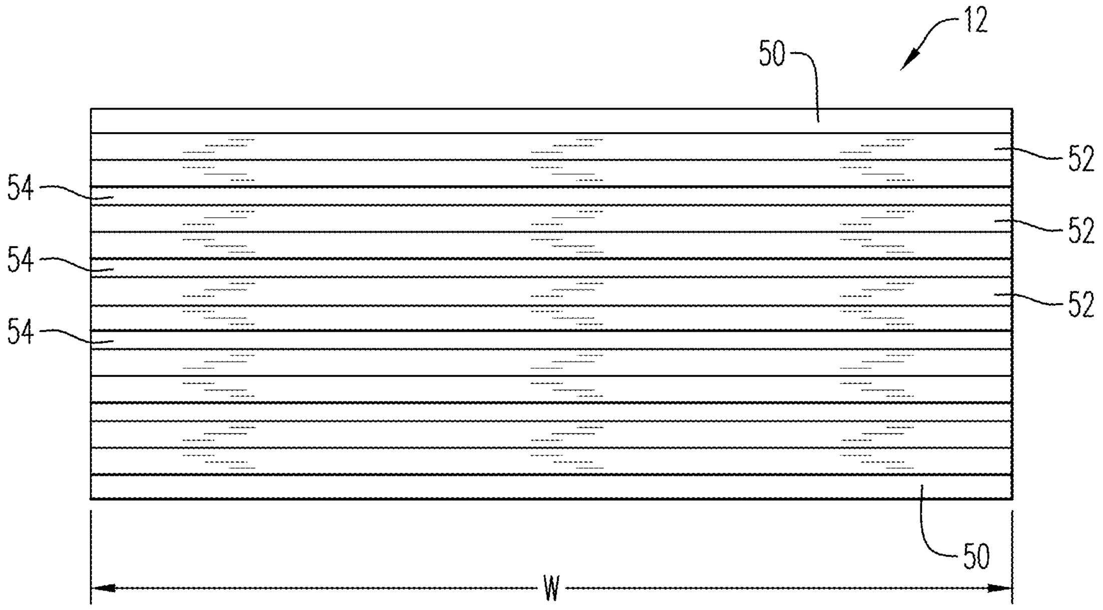
FIG. 11 is a bottom view of the piercing insert of FIG. 10.
Figure 12:
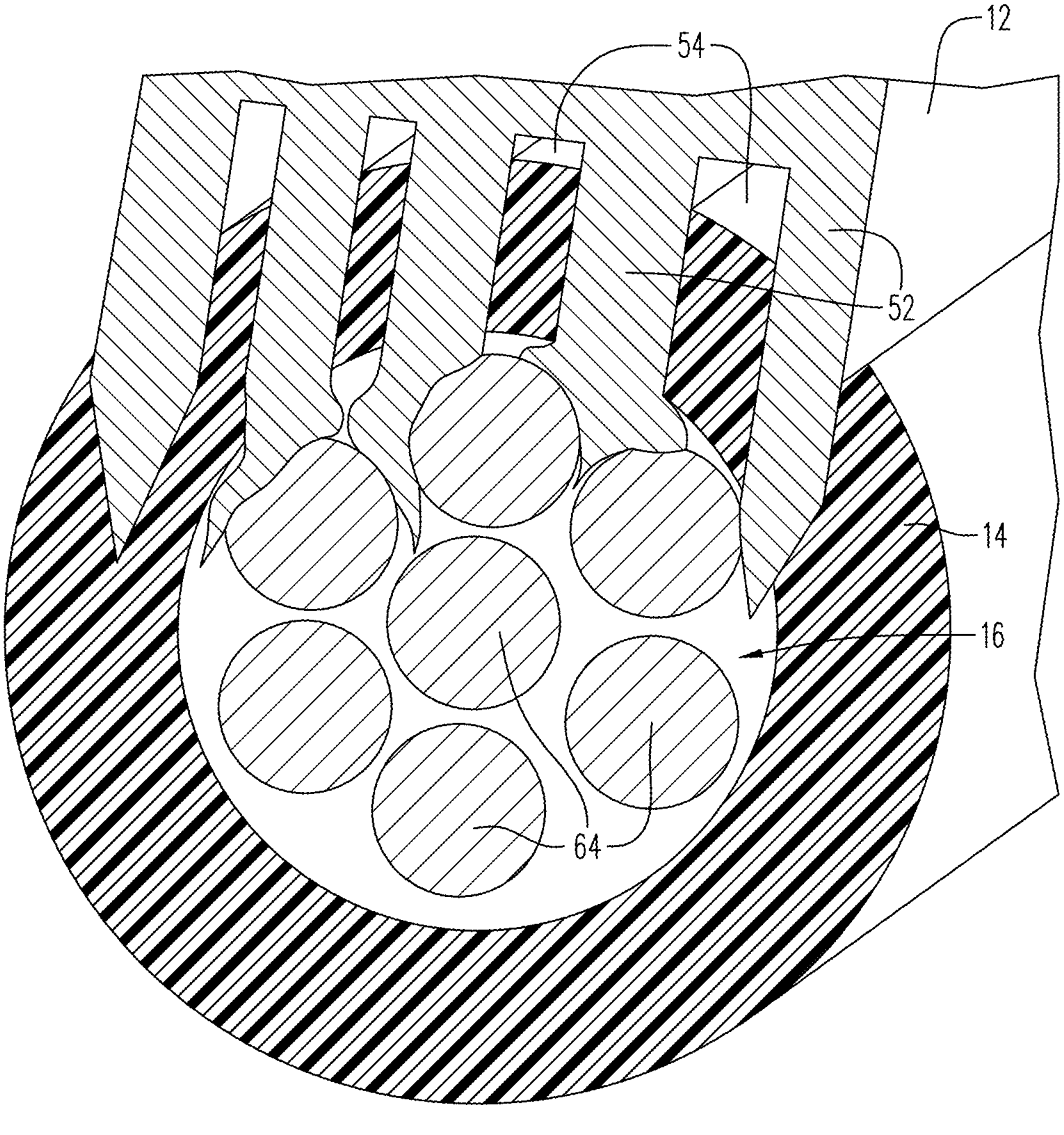
FIG. 12 is a magnified sectional view of the piercing insert of the tap connector of FIG. 1 installed on the electrical conductor.

Piercing insert 12 is described in more detail with respect to FIGS. 10-12.

Piercing insert 12 includes a connecting base 50 and a plurality of teeth 52 depending from the base and separated from one another by a gap 54. Teeth 52 each have a root 56 and a tip 58.

In some embodiments, teeth 52 depend from base 50 along a width (W) so that roots 56 are substantially parallel to one another. Additionally and/or alternately, tips 58 are formed as pointed cones. Additionally and/or alternately, teeth 52 all terminate at flat piercing plane 60.

Base 50 is secured to first jaw 22 so that width (W) of insert 12 is perpendicular to length (L) of first member 22. In some embodiments, base 50 is pressed into a corresponding slot 62 in first member 22 (shown in FIGS. 4 and 6). Stated differently, tap connector 10 is arranged so that teeth 52 run parallel to conductor 14.

It should be recognized that piercing insert 12 is described herein by way of example only as being separate from, but connected to first jaw 22. Of course, it is contemplated by the present disclosure for piercing insert 12 to be integrally formed as one piece with first jaw 22.

Without wishing to be bound by any particular theory, it is believed by the present disclosure that that the parallel configuration of teeth 52 allows tips 58 to pierce insulation 14 and into wedge between individual strands 64 of conductor 16 and that gaps 54 between the teeth provide a space that receives insulation 14 once pierced as schematically illustrated in FIG. 12.

Piercing insert 12 can be made of any electrically conductive material such as, but not limited to aluminum, silver, copper, and any alloys or combinations thereof that provides sufficient rigidity to pierce insulation 14 and wedge between individual strands 64 of conductor 16, yet sufficient deflection/deformation to deform into the spaces within the conductor.

Figure 8:
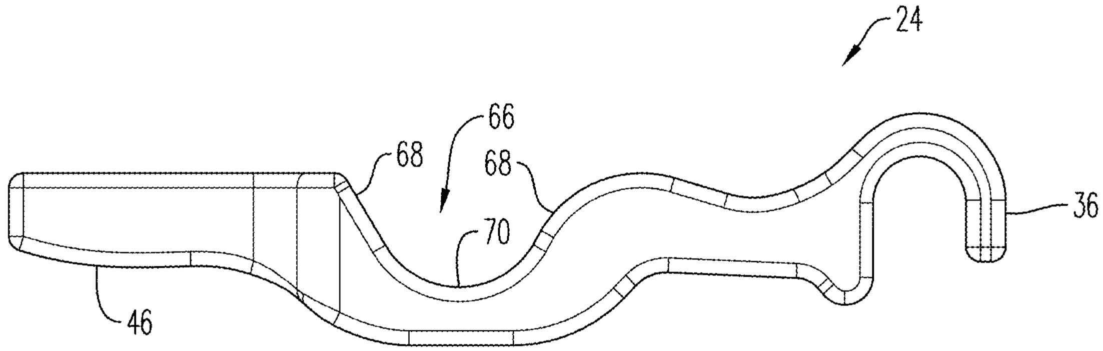
FIG. 8 is a side view of a second jaw of the tap connector of FIG. 1.
Figure 9:
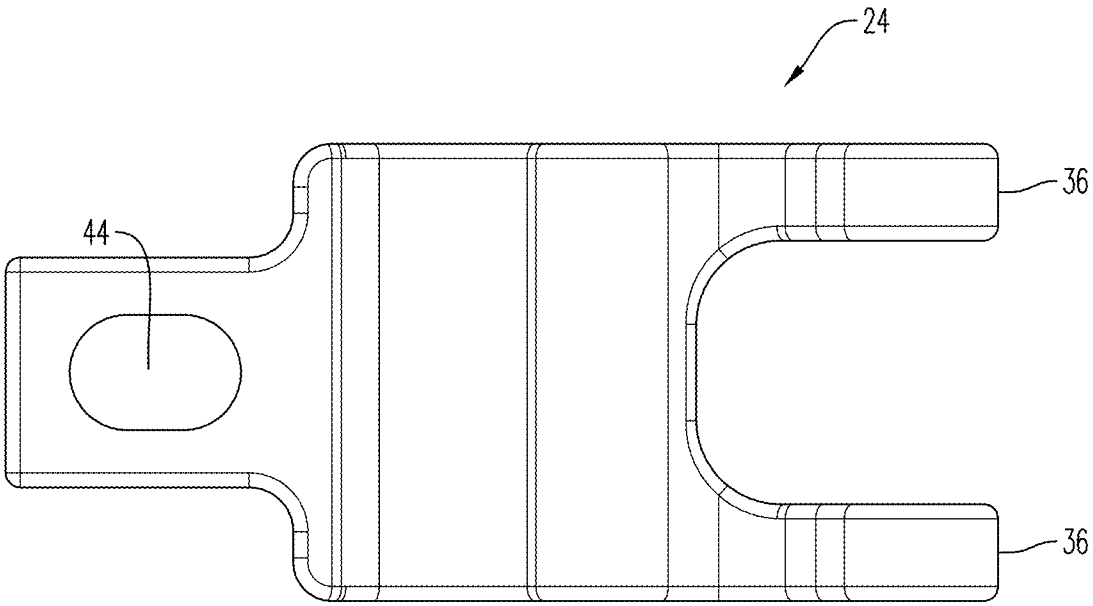
FIG. 9 is a top view of the second jaw of FIG. 8.

Referring to FIG. 8, second jaw 24 includes a centering indentation 66 opposite piercing insert 18. Indentation 66 has sloped sides 68 that are configured guide conductor 16 to a central location 70 within the indentation.

Figure 13:
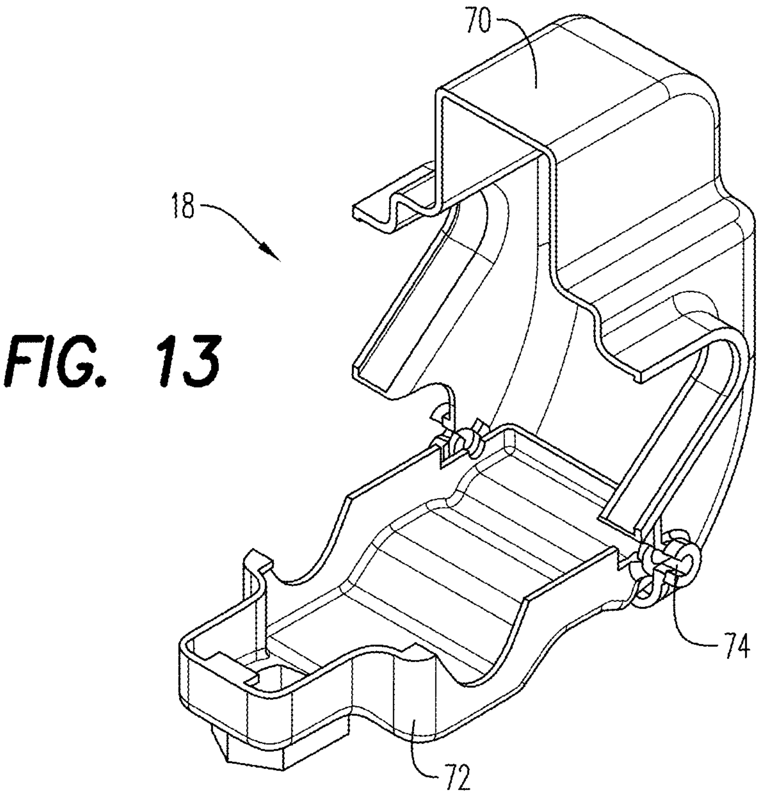
FIG. 13 is a perspective view of an insulating cover of the tap connector of FIG. 1 shown in an open position.
Figure 14:
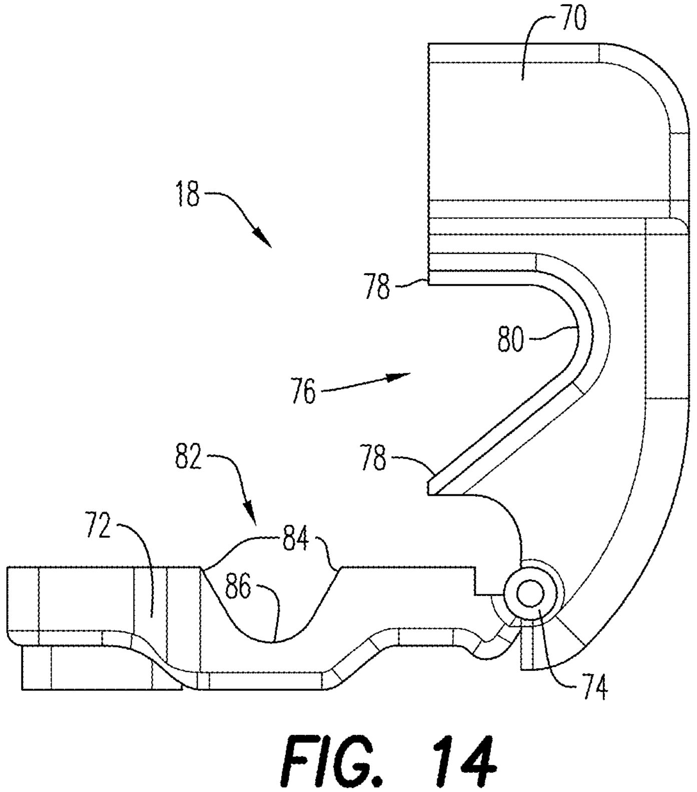
FIG. 14 is a side view of the insulating case of FIG. 13.

Cover 18 is described with reference to FIGS. 13-14, as well as FIGS. 1-3. Cover 18 has a first side 70 received on first member 22 and a second side 72 received on second member 24. In some embodiments, first and second sides 70, 72 have a hinged connection 74. Course it is contemplated by the present disclosure for cover 18 to be a single member or for sides 70, 72 to be separate from one another.

In some embodiments, first side 70 has a first opening 76 that has a wider base 78 then apex 80, which allows the first side to hinge down over conductor 16 during closing of tap connector 10. Similarly in some embodiments, second side 72 has a second opening 82 that has a wider base 84 then apex 86, which allows conductor 16 to center within the second opening during closing of tap connector 10.

In embodiments where second jaw 24 is made of non-conductive material, it is contemplated by the present disclosure for cover 18 to only include first side 70.

Returning to FIGS. 1-3, the installation of tap connector 10 is described. Tap connector 10 is opened to the position shown in FIGS. 2-3 and conductor 16 is placed in centering indentation 66 of second jaw 24. First jaw 22 is then pivoted around hinged connection 26 so that piercing insert 18—depending on the diameter of conductor 16—at least contacts and/or pierces insulation. Then, compression connection 30 is tightened to draw first and second jaws 22, 24 to a fully closed position as shown in FIG. 1 with teeth 52 piercing insulation 14, extending between strands 64 of conductor and deformed around the conductor. In this manner, tap connection 10 is configured to form a secure electrical contact between conductor 16 and stirrup 20 through insert 18 and first jaw 22.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST tap connector 10
piercing insert 12
insulation 14
electrical conductor 16
insulating cover 18
stirrup or bail 20
first jaw 22
second jaw 24
hinged connection 26
one end 28
compression connection 30
opposite end 32
length (L)
hinge pin 34
hinge knuckle 36
openings 38
bolt 40 nut 42
elongated openings 44
convex curved lands 46
connecting base 50
plurality of teeth 52
gap 54
root 56
tip 58
width (W)
piercing plane 60
slot 62
strands 64
centering indentation 66
sloped sides 68
central location 70
first side 70
second side 72
hinged connection 74
first opening 76
base 78
apex 80
second opening 82
base 84
apex 86

What is claimed is:

1. A tap connector for piercing an insulation of a conductor, comprising:
- a first jaw;
- a second jaw;
- a hinged connection connecting an end of the first and second jaws to one another;
- a compression connection removably connecting an opposite end of the first and second jaws to one another;
- a piercing insert depending from the first jaw in an electrically conductive manner between the end and the opposite end, wherein the piercing insert and the first jaw are made of or at least coated with an electrically conductive material; and
- a centering indentation in the second jaw, the centering indentation being positioned opposite the piercing insert and being configured to receive the conductor therein so that the piercing pierces the insulation of the conductor when positioned in the centering indentation,
- wherein the piercing insert comprises a plurality of teeth that all terminate at a flat piercing plane.

2. The tap connector of claim 1, wherein the piercing insert is positioned closer to the opposite end than to the end.

3. The tap connector of claim 1, further comprising an insulating cover covering the first and/or second jaw.

4. The tap connector of claim 1, further comprising a stirrup made of or at least coated with an electrically conductive material, the stirrup being connected in an electrically conductive manner to the first jaw.

5. The tap connector of claim 1, wherein the hinged connection comprises:
- a hinge pin integrally defined on the first jaw; and
- a hinge knuckle integrally defined on the second jaw.

6. The tap connector of claim 5, wherein the hinge pin extends laterally from both sides of the first jaw and the hinge knuckle extends laterally from both sides of the second jaw.

7. The tap connector of claim 6, further comprising a stirrup made of or at least coated with an electrically conductive material, the stirrup being connected in an electrically conductive manner to opposite ends of the hinge pin.

8. The tap connector of claim 5, wherein the hinge knuckle is an open knuckle.

9. The tap connector of claim 5, wherein the compression connection is a threaded connection comprising a bolt and a nut.

10. The tap connector of claim 1, wherein the compression connection is a threaded connection comprising a bolt and a nut.

11. The tap connector of claim 10, further comprising an insulating cover covering the first and second jaws, the bolt and nut being operatively retained in position by the insulating cover.

12. The tap connector of claim 1, wherein the first and second jaws each further comprise an elongated opening and a convex curved lands on an outer surface at the compression connection.

13. The tap connector of claim 1, wherein the a plurality of teeth are separated from one another by a gap.

14. The tap connector of claim 13, wherein the plurality of teeth are substantially parallel to one another and have tips formed as pointed cones that all terminate at the flat piercing plane.

15. The tap connector of claim 13, wherein the piercing insert depending from the first jaw so that the plurality of teeth are parallel to the conductor.

16. The tap connector of claim 1, wherein the second jaw is made of or at least coated with an electrically conductive material.

17. The tap connector of claim 1, wherein the second jaw is made of an electrically non-conductive material.

18. A tap connector for piercing an insulation of a conductor, comprising:
- a first jaw;
- a second jaw;
- a hinged connection connecting an end of the first and second jaws to one another;
- a compression connection removably connecting the first and second jaws to one another;
- a piercing insert having a plurality of teeth each having a root that depends from the piercing insert, the roots being substantially parallel to one another and being separated from one another by a gap;
- a centering indentation in the second jaw, the centering indentation being positioned opposite the piercing insert and being configured to receive the conductor therein so that the piercing pierces the insulation of the conductor when positioned in the centering indentation, the piercing insert depending from the first jaw in an electrically conductive manner so that the plurality of teeth are parallel to the conductor, and wherein the piercing insert and the first jaw are made of or at least coated with an electrically conductive material.

19. The tap connector of claim 18, wherein the plurality of teeth each have tips at an end of the root, respectively, the plurality of tips being formed as pointed cones that all terminate at a flat piercing plane.

* * * * *